3,829,390
ALUMINUM HYDRIDE PRODUCT

Eugene C. Ashby, William D. Taylor, and Donald A. Winkler, Baton Rouge, La., assignors to Ethyl Corporation, Richmond, Va.
No Drawing. Filed Mar. 29, 1963, Ser. No. 269,851
Int. Cl. C01b 6/00; C06d 5/00
U.S. Cl. 252—188   5 Claims This invention relates to the manufacture of alane products, or, as more commonly expressed, aluminum hydride, $AlH_3$. More particularly, the invention relates to a new and improved process whereby high yields of aluminum hydride in a new, stable solution form are achieved at low cost from low cost raw materials. The products of the invention have particular utility as a source from which a crystalline, ether free aluminum hydride can be precipitated, which is of particular value as a propellant fuel. Further, the solutions are highly effective reducing agents for inorganic, and especially organic reduction reactions.

It has long been known that an aluminum trihalide, preferably the aluminum trichloride, can be reacted in an ether with a member of the class of hydrides consisting of alkali metal hydrides and alkali metal aluminum hydrides. This general reaction is disclosed in Schlesinger et al. Pat. 2,576,311. The reaction generally involved is as follows:

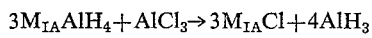

where $M_{IA}$ equals an alkali metal such as sodium, potassium or lithium. Despite the operability, chemically, of this reaction, as a practical matter lithium aluminum hydride has been the only accepted reactant for this type of reaction. The use of this particular reactant is itself disadvantageous because of the general high cost of lithium compounds and of lithium hydride products particularly. Over and above this factor, the reaction cited above has not been successful because the aluminum hydride released will not stay in solution as the monomeric material, but, in a matter of minutes, will precipitate out as a polymeric form, $(AlH_3)_x$, which is not suitable as a chemical reagent. Some increase in stability of ether solutions of aluminum hydride has been effected by providing an excess of lithium aluminum hydride, but this has not fully solved the problem. The prior art, then has been particularly deficient in that, firstly, an expensive reagent, lithium hydride or lithium aluminum hydride, has been required, and, secondly, in that the aluminum hydride solution formed has not been sufficiently stable against precipitations to be of general use.

An object of the present invention is to provide a new and improved process for the economical production of a stable solution of aluminum trihydride in a lower alkyl dialkyl ether. A further object is to provide, as new compositions, products which have particularly stable characteristics, and are essentially free of impurities, especially lithium compounds, and are essentially free of chlorides. An additional object is to provide sodium aluminum hydride as a new and novel active reactant. Other objects will appear hereinafter.

In its most general form, the present invention includes reacting for a limited period of reaction time of up to, preferably, about one hour, a new form of highly active sodium aluminum hydride, as defined more particularly hereinafter, with aluminum chloride, in a lower alkyl, dialkyl ether which functions as a reaction medium and as an aluminum hydride product solvent. The dialkyl ether is used in proportions to provide a product concentration of from about 0.1 up to 0.8 molal concentrations in the liquid phase upon substantial completion of the reaction, a preferred range being sufficient to provide a concentration of 0.4 to 0.6 molal. The reaction is carried out, as already mentioned for a sufficient time to provide a high yield of at least about 80 percent on the basis of the aluminum chloride. In the most preferred embodiments, a reaction period of not over one hour is used, and a conversion of at least about 90 percent is obtained. The highly active sodium aluminum hydride is sodium aluminum hydride in the wet form which has been made by the "direct" synthesis and has not been exposed to gas. The direct synthesis or Ashby process involves reacting subdivided aluminum metal and sodium, or if desired, sodium hydride, at supra-ambient temperatures with hydrogen under supra-atmospheric pressures (French Pat. 1,235,680). The reaction is carried out in a liquid reaction medium, which can be an inert hydrocarbon liquid, an ether of a polyglycol or an amine. In some instances, for example, when the reaction medium is tetrahydrofuran, the sodium aluminum hydride is produced in solution. In other cases, as when the reaction medium is toluene, finely divided sodium aluminum hydride is released. Either source of sodium aluminum hydride is satisfactory for providing the feed to the present invention. However, when the sodium aluminum hydride is synthesized in solution, it must be salted out by adding an inert hydrocarbon. The precipitated sodium aluminum hydride is separated as a sludge or thick slurry, and the traces of solvent ether or amine component are removed by additional quantities of hydrocarbon and repetition of separation of a thickened solids containing slurry. In these cases, care is taken to prevent exposure of the sodium aluminum hydride to gas.

On the other hand, when the reaction medium is an inert liquid hydrocarbon, it is only necessary to remove excess liquid, retaining, however, sufficient hydrocarbon so that the sodium aluminum hydride is thoroughly wetted and exposure to gas—even an inert gas—is prevented.

In all instances, then, the sodium aluminum hydride has not been exposed to gas and is accompanied by sufficient inert hydrocarbon to preserve its activity. The hydrocarbon is thus present to the extent of about five to twenty weight percent of the gross weight of the sodium aluminum hydride mixture in this active form. The sodium aluminum hydride content itself is usually of a purity of at least about 90 percent, and occasionally purities of 93 to 95 percent are encountered, the impurities being aluminum metal or minor inorganic compounds of sodium or aluminum which are innocuous in the present process.

In carrying out all forms of the process at least a slight excess of the active sodium aluminum hydride is used. In other words, at least a fraction of a percent of sodium aluminum hydride content, above the quantity required by the following equation, is used:

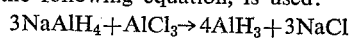

It will be understood that the slight excess required is on the basis of the sodium aluminum hydride content of the active reactant. Generally, larger excesses are employed. The common proportions are from about 1 percent to 70 percent excess of sodium aluminum hydride, a preferred range being 2 to 15 percent excess.

Good results are obtained generally in any embodiment of the process as described above, with respect to obtaining high yields of a high purity, stable, aluminum hydride ether solution. In all instances, agitation of the reacting mixture is required, and it has been discovered that the rapidity of reaction is particularly benefitted by providing high intensity agitation of the shearing type.

In commercial scale apparatus, simple or compound turbine type mixers are employed. On a laboratory scale, similar appaartus is provided. To illustrate the type of mixing involved, in a one-liter reaction flask, a four blade agitator revolving at the speed of about 20,000 r.p.m. is employed. In larger apparatus, simple turbine mixers, or turbine mixers including combination with a deflecting blade ring or a turbine impeller coupled with a dispersing screen are desirably employed and agitation levels providing peripheral speeds of 500 to 1000 feet per second are preferred.

The aluminum chloride employed should be preserved from contact with moist gas, and should be relatively high purity. A readily available commercial grade contains over 98 percent aluminum chloride. One effective method of introducing the aluminum chloride is to pre-prepare a solution thereof in the lower alkyl-dialkyl ether, the solution being prepared at sub-zero temperatures. This mode of providing the aluminum chloride is not absolutely critical, with respect to obtaining a stable product solution, but is very important with respect to readily obtaining high yields of 90 percent or better.

The sodium aluminum hydride, as already mentioned, is accompanied by small but significant quantities of inert hydrocarbon, of which toluene is a common example. The material is thus a wet-appearing granular material, not necessarily "mushy" but very perceptibly wet, so that retention of a portion in a transparent plastic container for an hour or so will result in the appearance of a small amount of separate liquid phase by seepage or draining of the hydrocarbon. Typical proportions of hydrocarbon are from 5 to 30 percent by weight of the mixture, and 5 to 20 percent is the customary and preferred proportions, when the inert hydrocarbon liquid is toluene. Proportions of as high as 50 percent have been satisfactorily used. In the case of other inert hydrocarbons, the weight proportions will vary slightly according to departures of the specific gravity of the hydrocarbon as such from the specific gravity of toluene. Other illustrative hydrocarbon components of the active sodium aluminum hydride feed include 2,2,3-trimethyl hexane, n-octane, benzene, the xylenes, ethyl benzene, decane and numerous other similar mobile, inert hydrocarbon liquids. It will be understood that the sodium aluminum hydride is free of moisture, inasmuch as even any residual quantities of moisture which might inadvertently be present in the hydrocarbon liquid will be destroyed by reaction with the sodium aluminum hydride content, but this introduces inorganic impurities in the system. The particle size of the sodium aluminum hydride is not highly critical, and is a result of the previous preparatory operation. Generally, typical particles are below the sizes which would pass through a 10-mesh screen and are retained on a 200-mesh screen.

In carrying out the process as already stated, the reaction is conducted in a lower alkyl-dialkyl ether, diethyl ether being particularly preferred. However, other well-known dialkyl ethers are eminently suitable, including, illustratively, dimethyl ether, methyl ethyl ether, methyl propyl ether, di-n-propyl ether, ethyl propyl ether, n-butyl ether, di-n-hexyl ether and other ethers having up to about six carbon atoms in one or both of the alkyl radicals. The ethers should be substantially anhydrous for best results.

The reaction as already described is carried out at low or only moderate temperatures, typically from 0 to 50° C., a preferred temperature range being from 0 to 35° C. In certain forms of operation, reaction is actually initiated at sub-zero temperatures and the reacting mixture is allowed to heat up to ambient temperatures as a result of the heat generated by the stirring. In the most preferred forms of the process, a relatively brief period is required, of the order of 5 minutes up to about one hour reaction time, a particularly preferred reaction period being from 5 to 20 minutes. When the preferred high intensity shearing type agitation is not used, but merely conventional paddle or anchor type agitation, longer reaction periods are required and somewhat lower yields are obtained.

Upon completion of the reaction, the reaction vessel includes an ether solution of the aluminum hydride resultant from the reaction and excess sodium aluminum hydride and the sodium chloride resultant from the reaction. These latter are present as subdivided solids. For recovery, then, agitation is discontinued and a brief settling period is provided, the liquid phase being withdrawn and filtered to remove fine solids and provide the product desired. An inert gas blanket is used.

The operation of the process and various alternative modes of the procedure will be clear from the following working examples, wherein all parts and proportions are in weight units, except where otherwise defined.

EXAMPLE 1

To a dry flask was added two liters of reagent grade diethyl ether. About 35 g. of pure aluminum chloride was added to the ether at −30° C. and dissolved, or enough to make aluminum hydride in a 0.5 molal solution. The solution was allowed to warm to about 5° C. and 55 parts of active sodium aluminum hydride was added while agitating at a high intensity, e.g. 20,000 r.p.m. four blade turbine agitator. The sodium aluminum hydride was commercially made, direct synthesis active material including 90 percent solids and 10 percent by weight of toluene, the solids being 90 percent purity $NaAlH_4$. 55 g. of this feed was provided, amounting to a 10 percent excess. Reaction proceeded smoothly and the temperature of the mixture rose slightly. Analysis of the liquid phase, after reacting one hour, showed over 85 percent of the aluminum chloride had been converted to aluminum hydride. The chloride content of the solution amounted to about 0.3 wt. percent of the aluminum hydride content.

The following example illustrates an alternative operation, in which the aluminum chloride is fed in solid form to the reaction.

EXAMPLE 2

In this operation a corresponding amount of sodium aluminum hydride, as used in Example 1, was slurried in the diethyl ether at a temperature of 10° C. Solid aluminum chloride was then added while stirring with a four bladed turbine type agitator operated to provide a peripheral speed of 650 feet per minute. A sample taken 15 minutes after the aluminum chloride was fed showed a conversion of 82 percent, with no chloride being detectable in the liquid phase. The yield obtained in a one-hour reaction period was 91 percent.

EXAMPLE 3

In this operation, the aluminum chloride was dissolved in diethyl ether at −30° C. and the solution allowed to become warmed to about 5° C. Freshly made, direct synthesis, sodium aluminum hydride (of about 95 percent purity on dry basis, with 10 percent toluene, wet basis) was added in 10 percent excess. High intensity agitation was provided (peripheral speed, 600–650 ft. per second, turbine type agitator) and a yield of about 95 percent was obtained in not more than 15 minutes, the chloride content of the product liquid solution being about 0.2 wt. percent of the aluminum hydride content.

The products (that is, the liquid solutions of aluminum hydride from the foregoing operations), illustrated extremely high stability as shown in the following examples.

EXAMPLE 4

Specimens of the products of a series of runs corresponding to Example 3, as well as Examples 1 and 2, were stored in sealed bottles at ambient temperatures of about 20–25° C. No observation of decomposition or precipitation in any of these cases, was noted in an observation period of 20 to 30 days. In contrast, when specimens were made by reacting lithium aluminum hydride and aluminum chloride, in approximately stoichiometric proportions, and at similar concentrations, these showed gross precipitation of polymeric aluminum hydride in 1 to 2 hours. When excess lithium aluminum hydride was used, according to the best previously known practice, gross precipitation of aluminum hydride, and partial decomposition to gray solids, occurred in 24 to 48 hours.

Surprisingly, when lithium aluminum hydride is added to specimens of the present product, precipitation occurs in several hours. In other words, the additive proposed by prior methods as a stabilizing agent actually induces polymerization and precipitation of the present product.

Further examples of the invention are given in the following compilation:

| Ex. | Inert hydrocarbon | Wt. percent inert hydrocarbon | NaAlH$_4$ ratio to theoretical | Mode of addition of aluminum chloride | Reaction solvent | Average reaction temperature, °C. | Reaction time, hr. | Concentration of product, molal |
|---|---|---|---|---|---|---|---|---|
| 5 | Diethyl benzene | 5 | 1.003/1 | Dissolve in solvent at −20 to −30° C. before adding NaAlH$_4$ reactant. | Diethyl ether | 5 | ¾ | 0.15 |
| 6 | Ethyl benzene | 12 | 1.5/1 | do | Dimethyl ether | 10 | ¼ | 0.25 |
| 7 | o-Xylene | 7 | 1.05/1 | do | di-n-butyl ether | 20 | ¼ | 0.5 |
| 8 | 2,2,3-trimethylhexane | 10 | 1.025/1 | Add solids to NaAlH$_4$ slurry | Dihexyl ether | 30 | ½ | 0.75 |
| 9 | Decanenonane | 18 | 1.6/1 | do | Methyl ethyl ether | 15 | ¹ 10 | 0.4 |
| 10 | Toluene | 7 | 1.05/1 | Dissolve in ether at −20 to −30° C. before adding NaAlH$_4$ reactant. | di-Isopropyl ether | 20 | ¹ 20 | 0.6 |
| 11 | Mesitylene | 35 | 1.10/1 | do | Ethyl n-propyl ether | 20 | ⅚ | 0.3 |

¹ Minutes.

The foregoing examples illustrate the scope and flexibility of the process. The sodium aluminum hydride reactant used in all the foregoing examples was direct synthesis material made as previously described and free of any gas exposure since generation.

For the greatest benefits, as obtained in the preferred embodiments of the process, the combination of direct synthesis sodium aluminum hydride (which has not been exposed to gas and is accompanied by and wetted with inert hydrocarbon) is used in conjunction with the particularly vigorous or high intensity agitation of the predominantly shearing type. Omission of either of these factors results in signficant disadvantages. For example, if the sodium aluminum hydride, 99 percent purity, has been recrystallized from solution in tetrahydrofuran, and dried then yields of only about 70 percent are obtained after extended periods of 6 to 20 hours, even if high intensity shearing agitation is provided during the reaction. The reaction proceeds at such a rate that the chloride concentration in the liquid phase decreases very slowly. When direct synthesis, active, sodium aluminum hydride is reacted, but with conventional agitation, again yields of only about 70 percent are obtained in 6 to 20 hours. On the other hand, when our improved direct synthesis sodium aluminum hydride is used as the reactant and high intensity agitation is provided, the unusual results, of 94 percent yield of an essentially chlorine free product solution, is achieved in about 15 minutes. Thus omission of either of the above mentioned factors is detrimental to efficient production. It will be understood that the precise parameters of agitation, i.e., peripheral speeds, diameter ratios, etc., will vary according to the particular configuration of the reaction employed.

Having described the process and compositions of the invention fully, what is claimed is:

1. A stable, essentially chloride and lithium free solution of aluminum hydride in a molar concentration of 0.1 to 0.8 in a lower alkyl dialkyl ether, said solution being precipitate free after a period of at least 24 hours at a temperature of about 20° C.

2. A stable essentially chloride and lithium free solution of aluminum hydride in a molar concentration of from about 0.4 to about 0.6 in diethyl ether, said solution being precipitate free after a period of at least 24 hours at a temperature of about 20° C.

3. The improved process for manufacture of a stable aluminum hydride solution, essentially free of chloride and lithium content, in a lower alkyl dialkyl ether, consisting of the steps of (a) preparing direct synthesis sodium aluminum hydride from a sodium reactant selected from the group consisting of sodium metal and sodium hydride, and aluminum metal, by pressure hydrogenation in the presence of an inert hydrocarbon liquid reaction medium, and retaining the sodium aluminum hydride formed wet wtih 5 to 20 weight percent of said hydrocarbon based on the sodium aluminum hydride, (b) then reacting said sodium aluminum hydride with aluminum chloride in a lower alkyl dialkyl ether at a temperature of about 0 to 35° C., the sodium aluminum hydride being in proportions of from about 2 to 15 percent excess, and the reaction mixture being agitated at high intensity shearing conditions for a reaction period of up to about one hour and until the liquid phase is essentially chloride free, and (c) separating the solution of aluminum hydride.

4. The process of claim 3 further defined in that the inert hydrocarbon liquid reaction medium is toluene and the lower alkyl dialkyl ether is diethyl ether.

5. A stable, essentially chloride and lithium free solution of aluminum hydride in a molar concentration of from about 0.4 to 0.6 in diethyl ether, prepared by the process consisting essentially of (a) preparing direct synthesis sodium aluminum hydride from a sodium reactant selected from the group consisting of sodium metal and sodium hydride, and aluminum metal, by pressure hydrogenation in the presence of an inert hydrocarbon liquid reaction medium, and retaining the sodium aluminum hydride formed wet with about 5 to 20 weight percent of said hydrocarbon based on the sodium aluminum hydride, (b) then reacting said sodium aluminum hydride with aluminum chloride in diethyl ether at a temperature of about 0 to 35° C., and in proportions to provide a product solution having a molar concentration of about 0.4 to 0.6, the sodium aluminum hydride being in proportions of from about 2 to 15 percent excess, and the reaction mixture being agitated at high intensity shearing conditions for a reaction period of up to about one hour and until the liquid phase is essentially chloride free, and (c) separating the solution of aluminum hydride.

References Cited

UNITED STATES PATENTS

| | | | |
|---|---|---|---|
| 2,900,224 | 8/1959 | Hinckley et al. | 423—644 |
| 2,920,935 | 1/1960 | Finholt | 423—644 |
| 2,865,727 | 12/1958 | De Dupper | 149—87 X |
| 2,937,824 | 5/1960 | Krumbholz et al. | 149—87 X |

BENJAMIN R. PADGETT, Primary Examiner

U.S. Cl. X.R.

149—87, 120; 252—1; 423—265, 645